United States Patent [19]

Simms et al.

[11] Patent Number: 5,322,535

[45] Date of Patent: Jun. 21, 1994

[54] PNEUMATIC FILTER CLEANING APPARATUS

[75] Inventors: Marvin Simms; Philip H. Moslener, both of Montreal, Canada

[73] Assignee: Diversitech Equipment & Sales (1984) Ltd., Ville Mont Royal, Canada

[21] Appl. No.: 113,702

[22] Filed: Aug. 31, 1993

[51] Int. Cl.$^5$ .............................................. B01D 46/04
[52] U.S. Cl. ........................................ 55/294; 55/302
[58] Field of Search .................. 55/291, 292, 293, 294, 55/302

[56] References Cited

U.S. PATENT DOCUMENTS

| | | | |
|---|---|---|---|
| 2,796,146 | 6/1957 | Hersey et al. | 55/294 |
| 3,568,414 | 3/1971 | Spriggs et al. | 55/294 |
| 5,143,529 | 9/1992 | Means | 55/294 X |

OTHER PUBLICATIONS

Two (2) page photocopy of a brochure for "Cartridge Filter KEMPER SYSTEM 7000".
Drawn by: G. R. Title: Fred-SC Assembly Date: Jul. 15, 1992 p. 1 of 1.

Primary Examiner—Charles Hart
Attorney, Agent, or Firm—Donald E. Hewson

[57] ABSTRACT

A pneumatic filter cleaning apparatus for use in cleaning a hollow cylindrically-shaped air filter is disclosed. The hollow cylindrically-shaped air filter has a first exterior surface and a second exterior surface. One of the first and second exterior surfaces is used to capture an amount of contaminant thereon from contaminated air passed through the filter, when used within a piece of industrial machinery or equipment. The cleaning apparatus comprises a base member and a support frame mounted on the base member in rotatable relation thereto adapted to receive and retain the air filter in supported yet rotatable relation with respect to the cleaning apparatus. There is an air inlet adapted to allow a flow of compressed air into the cleaning apparatus and an air directing nozzle mounted in threadable engagement to an elongated threaded member that is in turn securely mounted to the base member and is disposed generally centrally within the air filter. The air directing nozzle has an outlet port in fluid communication with an air inlet. An electric motor and suitable drive means, such as a pulley arrangement, are mounted on the base member and are adapted to rotate the base member and the air directing nozzle with respect to the air filter so as to vary the relative radial position of the air directing nozzle with respect to the air filter. As the air directing nozzle is rotated around the elongated threaded member, the air directing nozzle is moved along the length of the air filter. In this manner, the air directing nozzle is moved so as to cover the entire surface of the air filter having contaminants thereon, while the air directing nozzle is caused to direct air over the entire air filter, thus cleaning the entire air filter.

19 Claims, 5 Drawing Sheets

PNEUMATIC FILTER CLEANING APPARATUS

FIELD OF THE INVENTION

This invention relates to cleaning apparatus for use in cleaning air filters and more particularly to cleaning apparatus for use in cleaning all cylindrically shaped air filters installed within an air filtration machine.

BRIEF DESCRIPTION OF THE DRAWINGS

Embodiments of the prior art and of the present invention will be described by way of the accompanying drawings, in which.

BACKGROUND OF THE INVENTION

Figure 1:
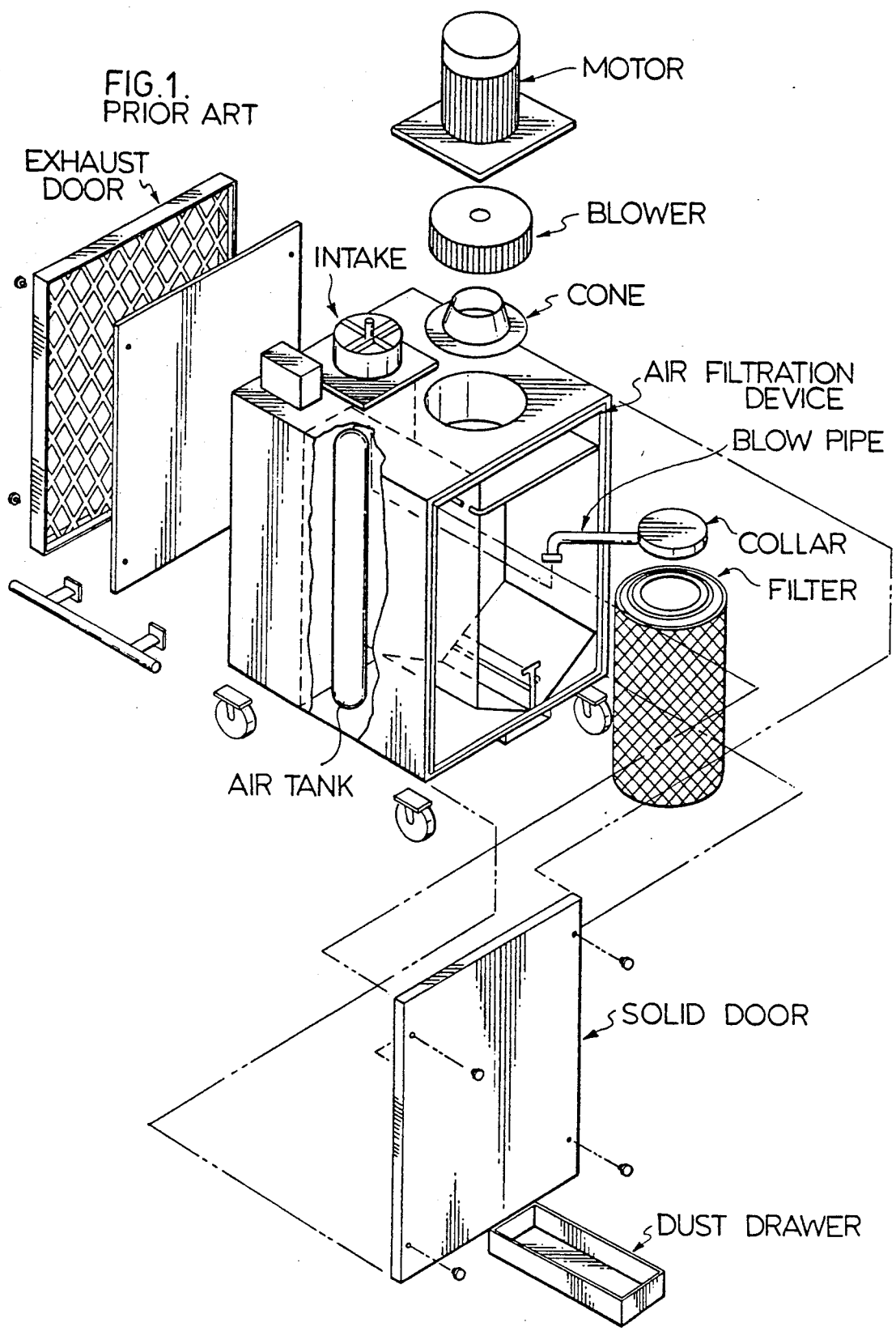
FIG. 1 is an exploded perspective view of an air filtration device that employs a hollow cylindrically shaped air filter in order to clean contaminated air and wherein the air filter is cleaned by a reverse pulse technique.

Reference will now be made to FIG. 1, which shows a conventional air filtration device in exploded view, that uses a hollow cylindrically shaped air filter therein for filtering the contaminants form contaminated air. This air filtration device is one that is suitable for installing the pneumatic filter cleaning apparatus of the present invention therein. The air filtration device has an intake that has attached to it in fluid communication therewith a suitable intake hose. The remote end of the intake hose has attached thereto appropriate air collector, such as a hood or the like, depending on the particular industrial application. Once the contaminated air has entered the air filtration device through the intake, it is then drawn through the hollow cylindrically-shaped air filter, which is mounted on a suitable support frame. The contaminants are filtered out by a mechanical air filter, and remain generally at the exterior of the air filter. The filtered air then flows upwardly through the center area of the air filter and is exhausted from the air filtration device through blower powered by an electric motor, both of which are mounted on the top of the air filtration device. The excess contaminants filtered by the hollow cylindrically-shaped mechanical air filter fall from the air filter into the dust drawer, which fits under the air filtration device and is slidably engaged within a support bracket. A pair of sloped channelling members under the air filter channel the excess contaminants through an opening in the bottom of the air filtration device underneath the hollow portion of the hollow cylindrically-shaped air filter.

Mechanical filters of various types are used in industrial air cleaning devices to remove the contaminants from contaminated air. Typically, such contaminated air results from the use of industrial machinery equipment, one example of which being welding machines.

Typically, the contaminated air flow being filtered is uni-directional and resultingly, the residue captured from the air collects mainly on one surface of the filter. It is necessary to clean these filters on an intermittent basis so that they do not become clogged and thereby cause reduced airflow. Most commonly, these filters are cleaned in a manner where unclear air is directed generally in the opposite direction to the direction of the direction of the contaminated airflow, to thereby dislodge the captured contaminants.

One way to clean such air filters is to remove the air filter from the piece of machinery or equipment and to direct blasts of compressed air at the filter. In industry, compressed air known as "shop" air, which is commonly of a pressure of about 90 p.s.i., is usually readily available.

The compressed air is blown through a nozzle having a relatively small outlet therein either directly at the side of the filter opposite the side that requires cleaning such that a stream of air is passed through the filter from the side opposite the side that needs cleaning to the side that needs cleaning, thereby essentially pushing the captured residue off the filter, or is blown directly at the surface to be cleaned at an oblique angle thereto. The compressed air may be pulsed—that is to say turned on and off intermittently—so as to have a more forceable impact on the residue. One disadvantage of cleaning air filters in this manner is that the air filter must be removed from the industrial air cleaning device before it can be cleaned. Further, this operation is labour intensive in that it is done by the operator of the industrial machine or equipment, typically by holding the air filter in one hand and operating the compressed air nozzle with the other hand.

A second way of cleaning an air filter is to provide a flow of air, preferably a pulsed flow of air, in a direction opposite that of the normal flow of air through the industrial machine or equipment. This is accomplished by releasing a blast of compressed air from an air tank, through a blow pipe and collar arrangement, and into the interior of the filter. Such blasts of air in a direction opposite that of the normal flow of air through the industrial machine tend to dislodge the contaminants from the side of the filter that it has collected on. It has been found, however, that it is difficult to dislodge the residue from the filter in this manner. It is often necessary to re-clean a filter that has been cleaned in this manner, by subsequently using compressed "shop" air, in a manner as described above.

Some examples of applications for the present invention include cleaning hollow cylindrically shaped air filters, that are used in industrial machinery or equipment such as welding fume extractors and dust collecting equipment such as those found in "bag houses" which are commonly used in industries such as cement factories, milling shops, grinding shops, flour grinding operations, smelters, and the like.

What is needed is an air filter cleaning system for automatically cleaning an air filter with compressed air, preferably within the confines of the air cleaning apparatus so that the air filter does not need to be removed therefrom, if desired.

It is an object of the present invention to provide a pneumatic cleaning apparatus for use in cleaning air filters.

It is another object of the present invention to provide a pneumatic cleaning apparatus for use in cleaning air filters, wherein the air filter remains in the industrial machinery or equipment.

It is another object of the present invention to provide a pneumatic cleaning apparatus for use in cleaning air filters, wherein the air filter remains in the industrial machinery or equipment and is cleaned by way of compressed air.

SUMMARY OF THE INVENTION

In one aspect of the present invention, there is provided a pneumatic filter cleaning apparatus for use in cleaning a hollow cylindrically shaped air filter, the hollow cylindrically shaped air filter having a generally centrally located longitudinal axis extending along the length thereof, and having a first exterior surface and a second interior surface. One of the first exterior surface and a second interior surface has, in use within a piece of industrial machinery or equipment, captured an amount of contaminates thereon from contaminated air passed through the filter. The cleaning apparatus comprises a base member and a support frame mounted on the base member and adapted to receive and retain the air filter in supported relation with respect to the cleaning apparatus. There is an air inlet adapted to allow a flow of compressed air into the cleaning apparatus and at least one air directing nozzle operatively mounted on the base member in movable cleaning relation to the air filter and having an outlet port in fluid communication with the air inlet. A first drive means is mounted on the base member and is adapted to rotate one of the air directing nozzle and the air filter with respect to each other so as to vary the relative radial position of the air directing nozzle with respect to the air filter. A second drive means is mounted on the base member and is adapted to move one of the air directing nozzle and the air filter with respect to each other so as to vary the relative longitudinal axial position of the air directing nozzle with respect to the air filter. In this manner, the air directing nozzle is moved so as to cover the entire surface of the air filter having contaminates thereon, while the air directing nozzle is caused to direct air over the entire air filter, thus cleaning the entire air filter.

DETAILED DESCRIPTION OF THE PREFERRED EMBODIMENTS

Figure 2:
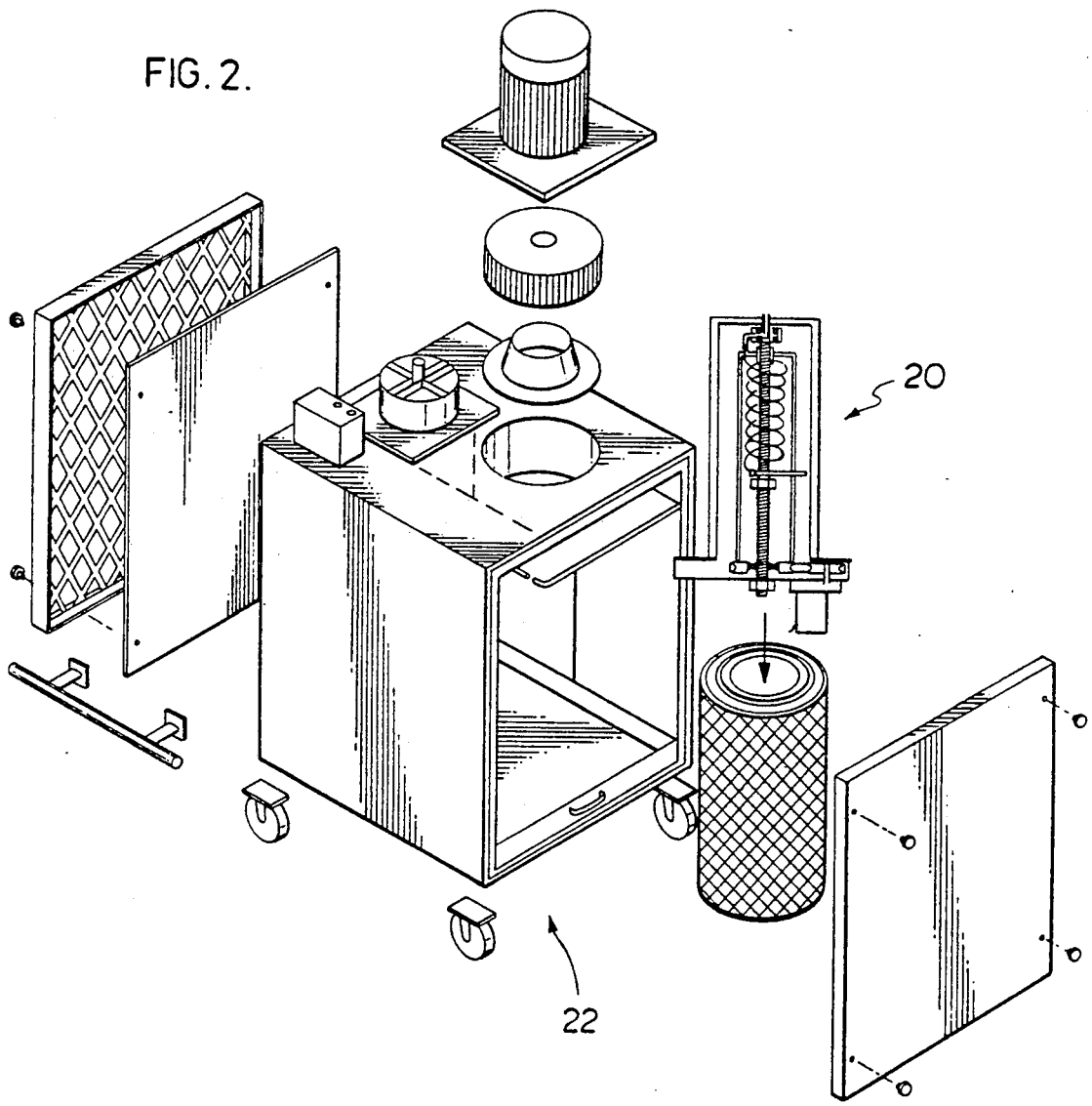
FIG. 2 is an exploded perspective view of an air filtration device that employs a hollow cylindrically shaped air filter in order to clean contaminated air and wherein the air filter is cleaned by the pneumatic air cleaning apparatus of the present invention
Figure 3:
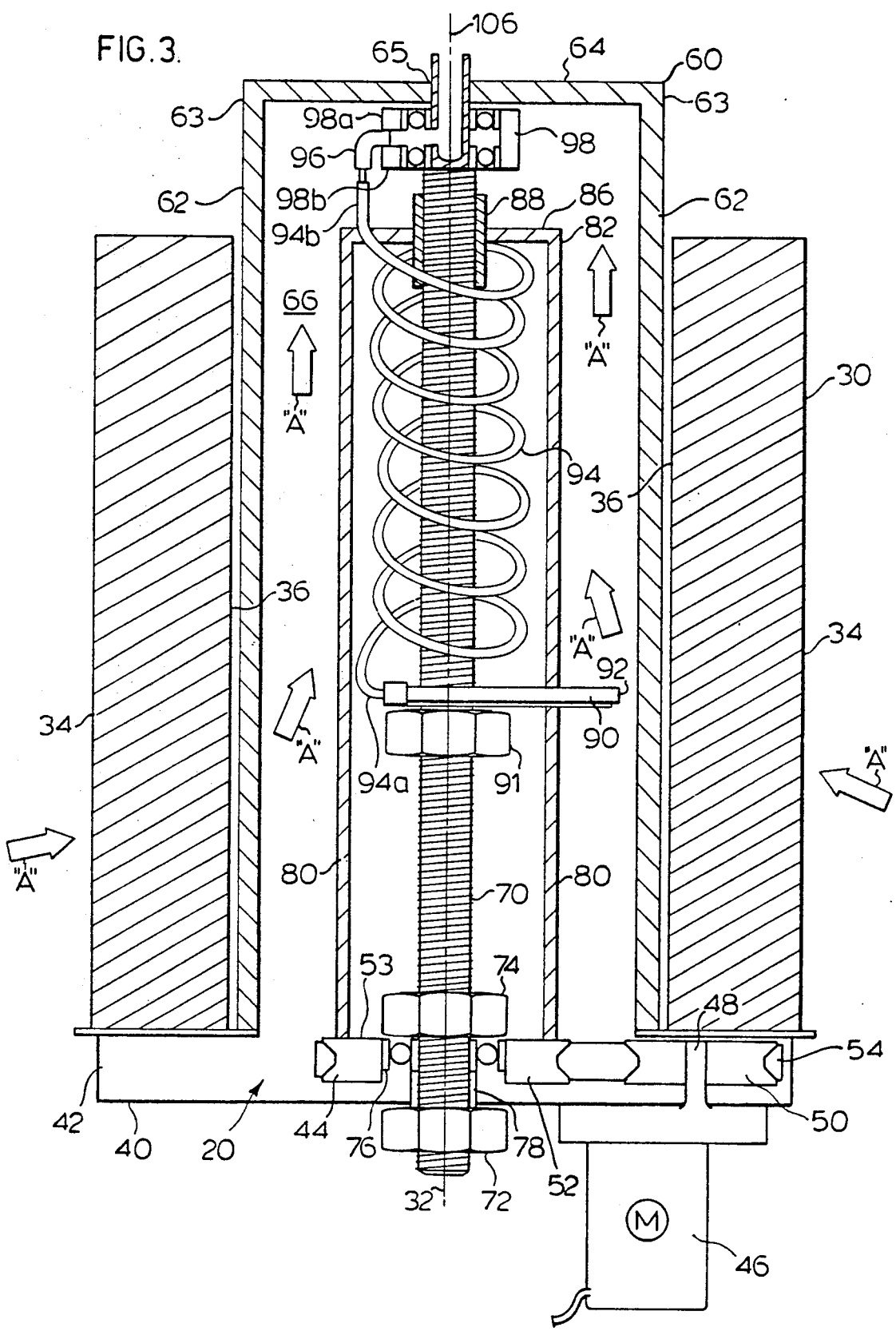
FIG. 3 is a partial sectional view of a hollow cylindrically shaped air filter installed in the air filtration device of FIG. 2, with the pneumatic air cleaning apparatus of the present invention installed therein.

Reference will now be made to FIGS. 2 and 3, which show the pneumatic filter cleaning apparatus 20 of the present invention installed within an air filtration device 22, similar to the air filtration device shown in FIG. 1. The hollow cylindrically-shaped air filter 30 has a generally centrally located longitudinal axis 32 extending along the length thereof and also has a first exterior surface 34 and a second interior surface 36. In normal use, air flow through the hollow cylindrically-shaped air filter 30 is in the direction of arrows "A". Resultingly, the captured contaminants tend to collect on the first exterior surface 34 of the hollow cylindrically-shaped air filter 30.

The filter cleaning apparatus 20 comprises a base member 40, which, in turn, comprises a stationary portion 42 and a rotatable portion 44. Securely mounted on the stationary portion 42 is a geared electric motor 46, the output 48 of which geared motor 46 rotates a driver pulley 50. The driver pulley 50 drives a larger driven pulley 52 by way of a V-belt 54. The driven pulley 52 is in essence the rotatable portion 44 of the base member 40.

A support frame member 60 is mounted in secure relation to the stationary portion 42 of the base member 40. The support frame member 60 comprises four vertically extending rod members 62 spaced apart from one another around the stationary portion 42 of the base member 40. The rod members 62 are interconnected one to the other at their top ends 63 by a plate member 64. The plate member 64 is substantially perforated so as to allow for the passage of filtered air therethrough. The four vertically extending rod members 62 define a hollow interior 66 shaped and dimensioned to accommodate the pneumatic filter cleaning apparatus 20 of the present invention, and are also shaped and dimensioned to receive in intimate contact therewith the second interior surface 36 of the hollow cylindrically-shaped air filter 30 around the perimeter thereof.

Also mounted in secure relation to the stationary portion 42 of the base member 40 is an elongated threaded member 70. The elongated threaded member 70 is secured to the stationary portion 42 of the base member 40 by way of a first nut 72 below the base portion and a co-operating second nut 74 inside the hollow interior 66 of the cleaning apparatus 20. Retained between the first and second nuts 72, 74 are the stationary portion 42 of the base member 40, a ball-bearing member 76, which has been pressed fit into the center of the driven pulley 52, and a spacer member 78 between the ball-bearing member 76 and the stationary portion 42 of the base member 40, which spacer keeps the driven pulley 52 spaced from the stationary portion 42 of the base member 40.

Securely attached to the top side 53 of the driven pulley 52 is a pair of arm members 80 which are joined at their top 82 by a connecting member 86 having a central cylindrical bushing 88 therein. The cylindrical bushing 88 encases the top portion of the elongated threaded member 70 and thereby allows the pair of arm members 80 to be rotatably connected to the elongated threaded member 70. The cylindrical bushing 88 is preferably made from an "oil-lite" material and fits somewhat loosely around the elongated threaded member 70, in order to preclude excessive wear of the cylindrical bushing 88.

Operatively mounted in rotatable relation to the elongated threaded member 70 is an air-directing nozzle 90, which is securely attached to a brass nut 91, by any suitable means such as welding. The brass nut 91 is threadably engaged on the elongated threaded member 70. In this manner, the air-directing nozzle 90 is mounted interiorly in respect to the air filter. The air-directing nozzle 90 has an outlet port 92 at one end thereof, which outlet port 92 is positioned proximate to the second interior surface 36 of the air filter 30. The air-directing nozzle 90 is thereby operatively mounted in moveable cleaning relation to the air filter 30, and is thereby positioned to pass air through the hollow cylindrically shaped 30 air filter from the second interior surface 36 to the first exterior surface 34, so as to clean the first exterior surface 34.

An air hose 94 is connected at one end 94a thereof in fluid communication with the air-directing nozzle 90, and is connected in fluid communication at its other end 94b to a coupling 96, which is in turn connected in fluid communication to a lower portion 98b of rotating bushing 98. The coiled air hose 94 is coiled around the elongated threaded member 70 so as to accommodate vertical movement of the air-directing nozzle 90. The rotating bushing 98 is operatively mounted on the elongated threaded member 70 such that the lower portion 98b of the rotating bushing 98 rotates with respect to the elongated threaded member 70 in conjunction with rotation of the pair of arm members 80 and the air-directing nozzle 90. The upper portion 98a of the rotating bushing 98 is secured to the plate member thereabove 64. A coupling 106 exits that end of the rotating bushing 98 through an aperture 65 in the plate member 64. The coupling 106 is an air inlet that is attached in fluid communication to a source of compressed air and is thereby adapted to allow a flow of compressed air into the cleaning apparatus 20.

In operation, in order to clean the first exterior surface 34 of the hollow cylindrically-shaped air filter 30, the source of compressed air is turned on and the geared electric motor 46 is started to rotate, which in turn rotates the driver pulley 50 and the driven pulley 52. The rotating driven pulley 52 causes the pair of arm members 80 to correspondingly rotate, which in turn cause the air-directing nozzle 90 and the brass nut 91 that the air-directing nozzle 91 is mounted on to rotate around the elongated threaded member 70. The elongated threaded member 70 thereby acts as a second drive means, which is adapted to move the air-directing nozzle 90 with respect to the air filter so as to vary the relative longitudinal axial position of the air-directing nozzle 90 with respect to the hollow cylindrically-shaped air filter 30. In this manner, the air-directing nozzle 90 is rotatably raised to near the top 82 of the pair of arm members 80. As the air-directing nozzle 90 is rotatably raised, the outlet port 92 of the air-directing nozzle 90 is directed at the entire second interior surface 36 so as to pass air through the air filter 30 and to thereby clean the entire first exterior surface 34 of the air filter 30. As the air-directing nozzle 90 travels from the bottom of the elongated threaded member 70 to the top of the elongated threaded member 70, the coiled air hose 94 compacts slightly to accommodate the change in vertical positioning of the air-directing nozzle 90. When the air-directing nozzle 90 reaches near the top of the pair of arm members 80, the air-directing nozzle 90 comes in contact with a limit switch or micro switch (not shown), which is operatively connected to the geared electric motor 46, so as to cause the direction of rotation of the geared electric motor 46 to reverse. Correspondingly, the direction of rotation of the pair of arm members 80 and the air-directing nozzle 90 also reverses, thus causing the air-directing nozzle 90 to travel rotatingly down the elongated threaded member 70 until it reaches the bottom thereof, where at another limit switch or micro switch is contacted so as to turn off the geared motor 46. Correspondingly, the coiled air hose 94 extends to again accommodate the change in vertical positioning of the air-directing nozzle 90.

Figure 4:
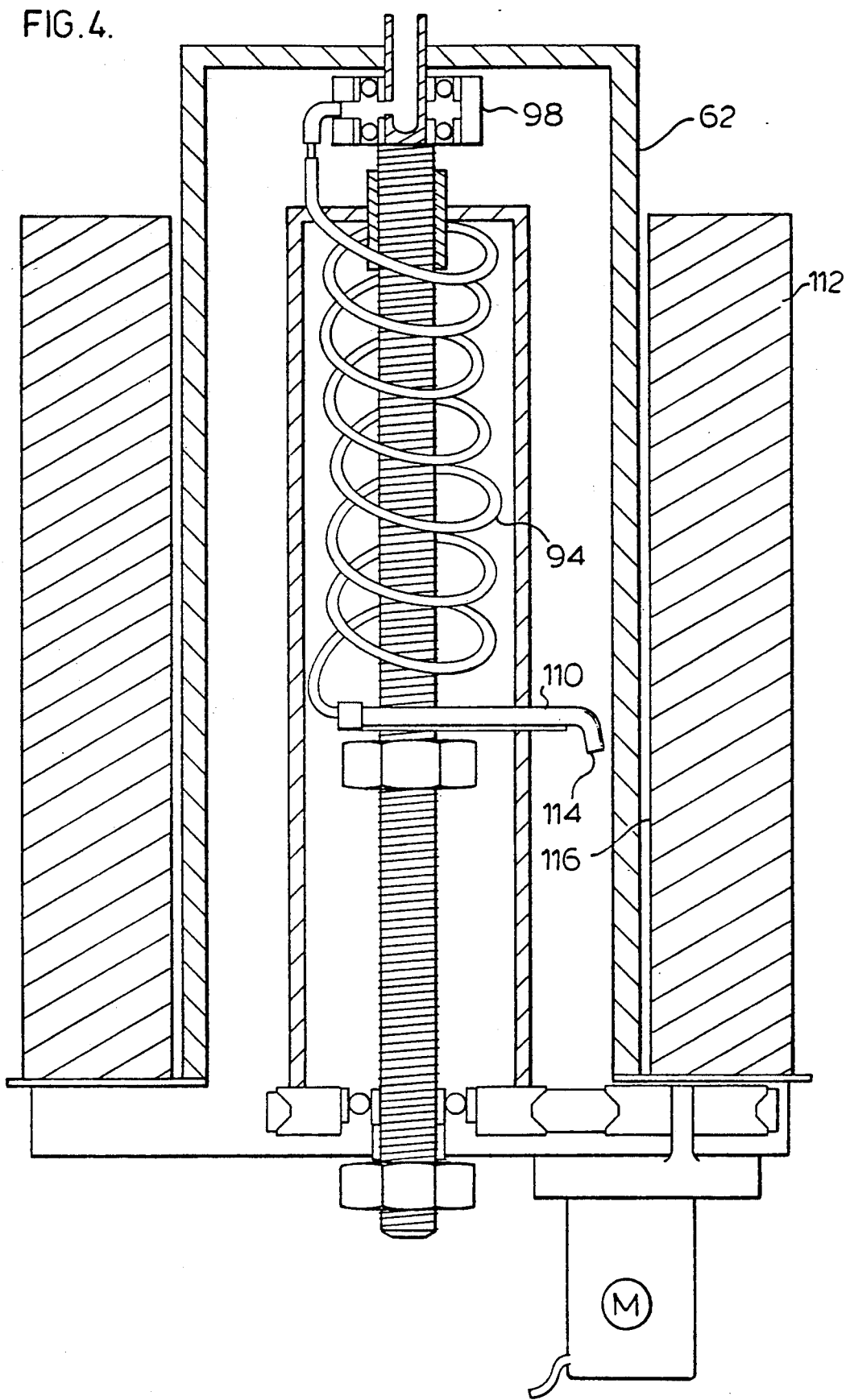
FIG. 4 is a partial sectional view of an alternative embodiment of the present invention.

In a first alternative embodiment, as shown in FIG. 4, it is contemplated that the air-directing nozzle 110 could be mounted interiorly with respect to the air filter 112 such that the outlet port 114 of the air-directing nozzle 110 is positioned proximate to the second interior surface 116 of the air filter 112, with the end of the air-directing nozzle being of a bent shape so as to orient the outlet port 114 at an oblique angle substantially tangential to the second interior surface 116 of the air filter 112. In this manner, the air-directing nozzle 110 would be positioned to pass air along the second interior surface 116 of the air filter 112 so as to clean the second interior surface 116 of contaminants.

Figure 5:
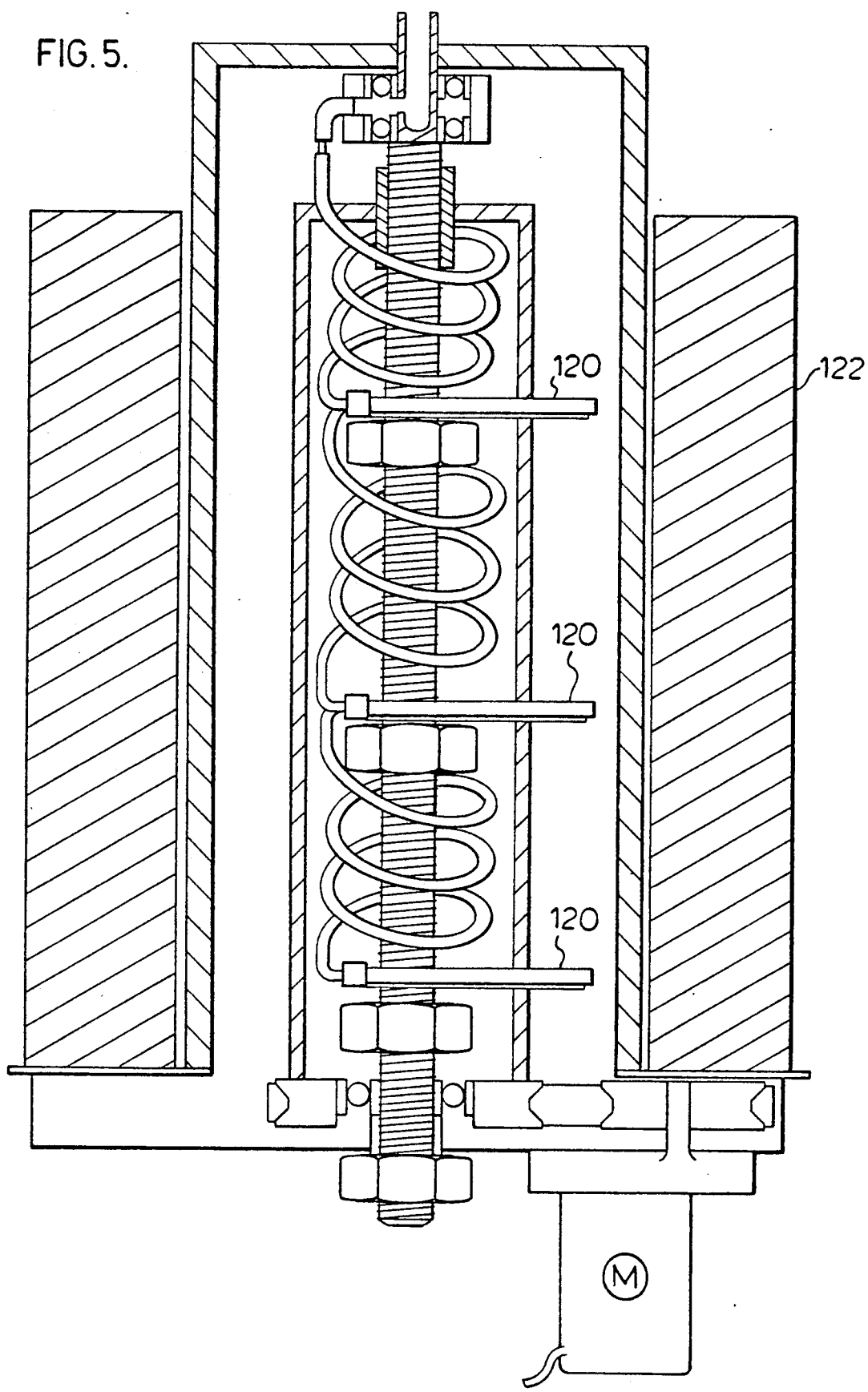
FIG. 5 is a partial sectional view of another alternative embodiment of the present invention.

In another alternative embodiment, as shown in FIG. 5, it is contemplated that a plurality of air-directing nozzles could be stacked one on top of another, with a space of perhaps a few inches between adjacent nozzles. The plurality of air-directing nozzles would preferably be in fluid communication with each other and would operate concurrently with one another. The advantage to such a system would be potentially quicker cleaning of an air filter due to a reduced vertical distance for the air-directing nozzles to travel.

In yet another alternative embodiment, it is contemplated that the air-directing nozzle is mounted exteriorly with respect to the air filter such that the outlet port of the air-directing nozzle is positioned proximate to the first exterior surface of the air filter. The air-directing nozzle would thereby be positioned to pass air through the air filter from the first exterior surface to the second exterior surface so as to, during operation, cause the second interior surface to be cleaned of contaminants.

In a further alternative embodiment, it is contemplated that the air-directing nozzle could be mounted exteriorly with respect to the air filter such that the outlet port of the air-directing nozzle is positioned proximate to the first exterior surface of the air filter, with the air-directing nozzle oriented at an oblique angle substantially tangential to the first exterior surface. In this manner, the air-directing nozzle would be positioned to pass air along the first exterior surface of the air filter so as to clean the first exterior surface of contaminants.

In yet a further alternative embodiment, it is envisioned that the support frame that is adapted to receive and retain the air filter thereon is rotatably attached to the base member. The geared electric motor acts as the drive means to rotate the support frame and thereby correspondingly rotate the filter member. The filter member may be moved upwardly and downwardly with respect to the air-directing nozzle or alternatively the air-directing nozzle may be moved upwardly and downwardly with respect to the rotating filter member.

In yet another alternative embodiment, it is also contemplated that the air-directing nozzle could be rotated while the air filter is moved upwardly and downwardly.

Other modifications and alterations may be used in the design and manufacture of the pneumatic filter cleaning apparatus of the present invention without departing from the spirit and scope of the accompanying claims.

What is claimed is:

1. A pneumatic filter cleaning apparatus for use in cleaning a hollow cylindrically shaped air filter, said hollow cylindrically shaped air filter having a generally centrally located longitudinal axis extending along the length thereof, and having a first exterior surface and a second interior surface, said cleaning apparatus comprising:

a base member;

a support frame mounted on said base member and adapted to receive and retain said air filter in supported relation with respect to said cleaning apparatus;

an air inlet adapted to allow a flow of compressed air into said cleaning apparatus;

at least one air directing nozzle operatively mounted on said base member in movable cleaning relation to said air filter and having an outlet port in fluid communication with said air inlet;

first drive means mounted on said base member and adapted to rotate one of said air directing nozzle and said air filter with respect to each other so as to vary the relative radial position of said air directing nozzle with respect to said air filter; and second drive means mounted on said base member and adapted to move one of said air directing nozzle and said air filter with respect to each other so as to vary the relative longitudinal axial position of said air directing nozzle with respect to said air filter.

2. The pneumatic filter cleaning apparatus of claim 1, wherein said air nozzle is moved by said second drive means and said air filter is stationary with respect to said base means.

3. The pneumatic filter cleaning apparatus of claim 2, wherein said air directing nozzle is mounted interiorly with respect to said air filter such that said outlet port of said air directing nozzle is positioned proximate to said second interior surface of said air filter, said air directing nozzle thereby being positioned to pass air through said filter from said second interior surface to said first exterior surface so as to clean said first exterior surface.

4. The pneumatic filter cleaning apparatus of claim 3, wherein said base member comprises a stationary portion and a rotatable portion and wherein said first drive means is an electric motor operatively connected to said frame member by way of a driving arrangement, wherein said rotatable portion of said base member is caused to rotate by said electric motor thereby causing said air directing nozzle to rotate with respect to said air filter.

5. The pneumatic filter cleaning apparatus of claim 4, wherein said second drive means is an elongated threaded member securely mounted on said stationary portion of said base member so as to be disposed generally along said longitudinal axis of said air filter and said air directing nozzle is threadably engaged on said elongated threaded member, and wherein the rotation of said rotatable portion of said base member causes said air directing nozzle to correspondingly rotate and thereby vary the relative longitudinal axial position of said air directing nozzle with respect to said air filter.

6. The pneumatic filter cleaning apparatus of claim 5, wherein said air directing nozzle is operatively connected to the rotating portion of the base member by way of a pair of arm members that are attached in secure relation to said rotating portion of the base member, and are rotatably connected to the top portion of said elongated threaded member.

7. The pneumatic filter cleaning apparatus of claim 6, comprising a coiled air hose connecting said air inlet and said air directing nozzle in fluid communication with each other, with said coiled air hose coiled around said elongated threaded member.

8. The pneumatic filter cleaning apparatus of claim 7, further comprising a rotatable bushing interposed in fluid communication between said coiled air hose and said air inlet.

9. The pneumatic filter cleaning apparatus of claim 1, wherein said air directing nozzle is mounted exteriorly with respect to said air filter such that said outlet port of said air directing nozzle is positioned proximate to said first exterior surface of said air filter, said air directing nozzle thereby being positioned to pass air through said filter from said first exterior surface to said second interior surface so as to clean said second interior surface.

10. The pneumatic filter cleaning apparatus of claim 1, wherein said air directing nozzle is mounted exteriorly with respect to said air filter such that said outlet port of said air directing nozzle is positioned proximate to said first exterior surface of said air filter, with said air directing nozzle oriented at an oblique angle substantially tangential to said first exterior surface of said air filter, said air directing nozzle thereby being positioned to pass air along said first exterior surface of said filter so as to clean said first exterior surface.

11. The pneumatic filter cleaning apparatus of claim 1, wherein said air directing nozzle is mounted interiorly with respect to said air filter such that said outlet port of said air directing nozzle is positioned proximate to said second interior surface of said air filter, with said air directing nozzle oriented at an oblique angle substantially tangential to said second interior surface of said air filter, said air directing nozzle thereby being positioned to pass air along said second interior surface of said filter so as to clean said second interior surface.

12. The pneumatic filter cleaning apparatus of claim 1, wherein said support frame is rotatably attached to said base member and said first drive means rotates said filter member.

13. The pneumatic filter cleaning apparatus of claim 12, wherein said air filter is moved by said second drive means and said air directing nozzle is stationary with respect to said base means.

14. The pneumatic filter cleaning apparatus of claim 1, wherein said cleaning apparatus is installed in an air filtration device.

15. The pneumatic filter cleaning apparatus of claim 14, wherein said air extraction machine is a welding fume filtration device.

16. The pneumatic filter cleaning apparatus of claim 14, wherein said air extraction machine is a dust collection device.

17. The pneumatic filter cleaning apparatus of claim 14, wherein said air extraction machine is a metal particle filtration device.

18. The pneumatic filter cleaning apparatus of claim 1, wherein said at least one air directing nozzle comprises a plurality of air directing nozzles.

19. The pneumatic filter cleaning apparatus of claim 16, wherein said air directing nozzles operate concurrently with one another.

* * * * *